US008937901B2

(12) United States Patent
Zhang et al.

(10) Patent No.: US 8,937,901 B2
(45) Date of Patent: Jan. 20, 2015

(54) CARRIER TIMING FOR WIRELESS COMMUNICATIONS SYSTEMS

(75) Inventors: Danlu Zhang, San Diego, CA (US); Aziz Gholmieh, San Diego, CA (US); Jilei Hou, San Diego, CA (US); Bibhu P. Mohanty, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 691 days.

(21) Appl. No.: 12/622,265

(22) Filed: Nov. 19, 2009

(65) Prior Publication Data

US 2010/0238857 A1 Sep. 23, 2010

Related U.S. Application Data

(60) Provisional application No. 61/160,987, filed on Mar. 17, 2009.

(51) Int. Cl.
*H04W 84/12* (2009.01)
*H04L 27/26* (2006.01)
*H04B 1/707* (2011.01)

(52) U.S. Cl.
CPC ............ *H04L 27/2601* (2013.01); *H04B 1/707* (2013.01)
USPC .......................................... 370/328; 370/310

(58) Field of Classification Search
None
See application file for complete search history.

(56) References Cited

U.S. PATENT DOCUMENTS

| 2005/0025257 | A1* | 2/2005 | Goldstein et al. | 375/316 |
| 2006/0274712 | A1* | 12/2006 | Malladi et al. | 370/345 |
| 2006/0280142 | A1* | 12/2006 | Damnjanovic et al. | 370/329 |
| 2007/0287476 | A1* | 12/2007 | Jeong et al. | 455/456.6 |
| 2008/0002660 | A1* | 1/2008 | Jeong et al. | 370/350 |
| 2009/0196163 | A1* | 8/2009 | Du | 370/204 |
| 2009/0213812 | A1* | 8/2009 | Park et al. | 370/331 |
| 2009/0270103 | A1* | 10/2009 | Pani et al. | 455/436 |
| 2010/0130218 | A1* | 5/2010 | Zhang et al. | 455/450 |
| 2010/0135346 | A1* | 6/2010 | Peters et al. | 372/29.011 |

(Continued)

FOREIGN PATENT DOCUMENTS

| CN | 101146327 A | 3/2008 |
| CN | 101204050 A | 6/2008 |

(Continued)

OTHER PUBLICATIONS

Huawei: "The definition of anchor carrier in DC-HSUPA Operation" *GPP TSG-RAN WG+ Meeting 56bisno. RI-091540, Mar. 23, 2009, pp. 1-2, XP002589069 Seoul KR Retrieved from the Internet: URL:http://ftp.3gpp.org/specs/html-info/TD ocExMtgâ Ri-56bâ 27331. htm [retrieved on Jun. 24, 2010].

(Continued)

*Primary Examiner* — Hassan Phillips
*Assistant Examiner* — Gautam Sharma
(74) *Attorney, Agent, or Firm* — Darren M. Simon

(57) ABSTRACT

Synchronization of uplink carriers for transmission is disclosed in accordance with different aspects. The uplink carriers that transmit information are configured such that at least one of the uplink carriers is an anchor carrier. When a plurality of carriers are thus configured for the uplink, they are synchronized such that they bear a predetermined phase relationship with each other. The predetermined phase relationship between the plurality of carriers depends on the transmit timing of the anchor carrier or a combination of transmit timings of the anchor carrier and one or more non-anchor carriers comprised within the uplink carriers.

24 Claims, 11 Drawing Sheets

(56) References Cited

U.S. PATENT DOCUMENTS

| | | | |
|---|---|---|---|
| 2010/0172428 A1* | 7/2010 | Pani et al. | 375/262 |
| 2010/0272017 A1* | 10/2010 | Terry et al. | 370/328 |
| 2010/0303011 A1* | 12/2010 | Pan et al. | 370/328 |
| 2010/0322158 A1* | 12/2010 | Lee et al. | 370/329 |

FOREIGN PATENT DOCUMENTS

| | | |
|---|---|---|
| CN | 101611570 A | 12/2009 |
| TW | 200723765 | 6/2007 |
| WO | WO2006116102 A2 | 11/2006 |
| WO | WO2009137180 A2 | 11/2009 |

OTHER PUBLICATIONS

International Preliminary Report on Patentability—PCT/US2010/027551, The International Bureau of WIPO—Geneva, Switzerland, May 6, 2011.

International Search Report and Written Opinion—PCT/US2010/027551, International Search Authority—European Patent Office—Jul. 12, 2010.

Qualcomm europe: "System Simulation Results for Dual Carrier HSUPA Operation" 3GPP TSG-RAN W61 56no. RI-090573, Feb. 10, 2009, Feb. 14, 2009, pp. 1-11, XP002589068 Athes Gr Retrieved from the Internet: URL:http://ftp.3gpp.org/specs/html-1nfo/TDocExMtgâ Ri-56â 27291. htm [retrieved on Jun. 24, 2010].

Seidel E, et al., "White paper—Dual Cell HSDPA and its future operation" Internet Citation Jan. 2009 , pp. 1-5, XP002574496 Retrieved from the Internet: URL:http://www.nomor.de [retrieved on Mar. 23, 2010] p. 2, left-hand column, line 17-line 26 p. 4, left-hand column, line 27-line 31.

Huawei: "Considerations on DC-HSUPA Operation" 3GPP Draft; R1-090886, 3rd Generation Partnership Project (3GPP), Mobile Competence Centre; 650, Route Des Lucioles ; F-06921 Sophia-Antipolis Cedex; France, no. Athens, Greece; Feb. 4, 2009; XP050318735 [retrieved on Feb. 4, 2009] the whole document.

Qualcomm Europe: "UE Implementation Impact due to DC-HSUPA", 3GPP TSG RAN WG1 Meeting #55bis, R1-090434, Jan. 16, 2009.

"Taiwan Search Report—TW099107820—TIPO—Jan. 21, 2013".

* cited by examiner

CARRIER TIMING FOR WIRELESS COMMUNICATIONS SYSTEMS

The present application for patent claims priority to Provisional Application No. 61/160,987 entitled "UE CROSS-CARRIER TRANSMIT TIMING SYNCHRONIZATION IN MULTI-CARRIER HSUPA" filed Mar. 17, 2009, assigned to the assignee hereof and hereby expressly incorporated by reference herein.

BACKGROUND

I. Field

The following description relates generally to wireless communications systems and more particularly to carrier timing.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Multi-carrier HSDPA (High-Speed Downlink Packet Access) technology enhances capability of communication systems to transmit packet data traffic in comparison to single-carrier HSDPA. While establishment and maintenance of control channels (HS-SCCH—High-Speed Shared Control Channel, HS-SICH—High-Speed Shared Information Channel) and traffic channel (HS-DSCH—High-Speed Downlink Shared Channel) is simpler in single-carrier HSDPA systems, it does not meet the requirements of multi-carrier transmission of HSDPA. Employing a plurality of carriers in a communication system leads to complexity in reception and decoding of carriers at both Node B and UE. Hence, solutions can be explored for simplifying transmission/reception of multiple carriers while retaining advantages afforded by the multi-carrier HSDPA technology.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

In accordance with an aspect, an apparatus operable in a wireless communication system for synchronizing various carriers is disclosed. The apparatus comprises a processor, a synchronization component, a transmission component and a memory. The processor generates transmission data for one or more uplink carriers. The synchronization component synchronizes transmit timings associated with the one or more uplink carriers. A transmission component transmits the synchronized carriers to a Node B while a memory coupled to the processor stores the data. The carriers can comprise at least one anchor carrier such that common uplink transmit timing is determined by the anchor uplink transmit timing or a combination of transmit timings of the anchor carrier and one or more non-anchor carriers. The apparatus can further comprise a multiplexer for multiplexing the data and a digital-to-analogue-converter that converts a single digital data stream, obtained by combining the synchronized data streams, into analogue signal.

A method of transmission that facilitates synchronization of uplink carriers is disclosed in accordance with an aspect. The method includes configuring one or more uplink carriers to transmit information wherein at least one of the uplink carriers is an anchor carrier. When a plurality of carriers are configured for the uplink, they are paired with at least a subset of received downlink carriers. The uplink carriers are then synchronized such that they bear a predetermined phase relationship with each other. The predetermined phase relationship between the plurality of carriers depends on transmit timing of the anchor carrier. The uplink carriers thus synchronized are subsequently transmitted.

A computer program product, comprising a computer-readable medium is disclosed in accordance with another aspect. The computer-readable medium comprises code for configuring one or more uplink carriers to transmit information to a Node B wherein at least one of the uplink carriers is an anchor carrier. It also comprises code for synchronizing transmit timing among the uplink carriers such that the transmit waveforms for the uplink carriers are aligned in time wherein the transmit timing of the anchor carrier or a combination of transmit timings of the anchor and one or more secondary carriers determines the phase relationship between the uplink carriers. It further comprises code for combining the uplink carriers into a single stream which is converted into an analogue signal for transmission.

An apparatus operable in a wireless communication system is disclosed in accordance with yet another aspect. The apparatus comprises means for configuring one or more carriers to transmit data to a Node B within a cell. It also comprises means for synchronizing transmit timing among the carriers such that the carriers maintain a predetermined phase relationship with each other.

An apparatus operable in a wireless communication system is disclosed in accordance with yet another aspect. The apparatus comprises a receiver and a processor. The receiver receives one or more uplink carriers from a transmitting UE wherein transmit timings of the uplink carriers are synchronized with each other. The processor reads data received from a UE via the one or more uplink carriers at least one of which is an anchor carrier. The transmit timing of the uplink non-anchor carriers is estimated based on transmit timing assigned by the Node B to the anchor carrier or by combining transmit timings of the anchor and non-anchor carriers. As the transmit timings of the uplink non-anchor carriers is synchronized with the corresponding anchor carrier, the transmission timings of different non-anchor carriers received in the uplink can be determined. This facilitates parallel processing of various transmissions received from different UEs in a cell.

A method used in a wireless communication system is disclosed in accordance with yet another aspect. The method comprises the steps of receiving a plurality of carriers and determining transmit timings of the non-anchor carriers comprised within the plurality of carriers. The plurality of carriers can comprise at least one anchor and one or more non-anchor carriers such that the transmit timing of a non-anchor carrier is based on a transmit timing of the corresponding uplink anchor carrier or a combination of transmit timings of the anchor and non-anchor carriers. This facilitates determining position of a UE transmitting at least a subset of the plurality of carriers based on the transmit timings of the subset of carriers. In a further aspect, the plurality of carriers can be transmitted by a plurality of UEs. This aspect facilitates processing transmissions from the plurality of UEs simultaneously based at least on the transmit timings of the uplink carriers.

An apparatus operable in a wireless communication system is disclosed in accordance with another aspect. The apparatus includes means for receiving a plurality of carriers comprising at least one anchor carrier. It also comprises means for determining transmit timings of non-anchor carriers comprised within the plurality of carriers based at least on transmit timing of the anchor carrier or the transmit timings of the anchor and the non-anchor carriers.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
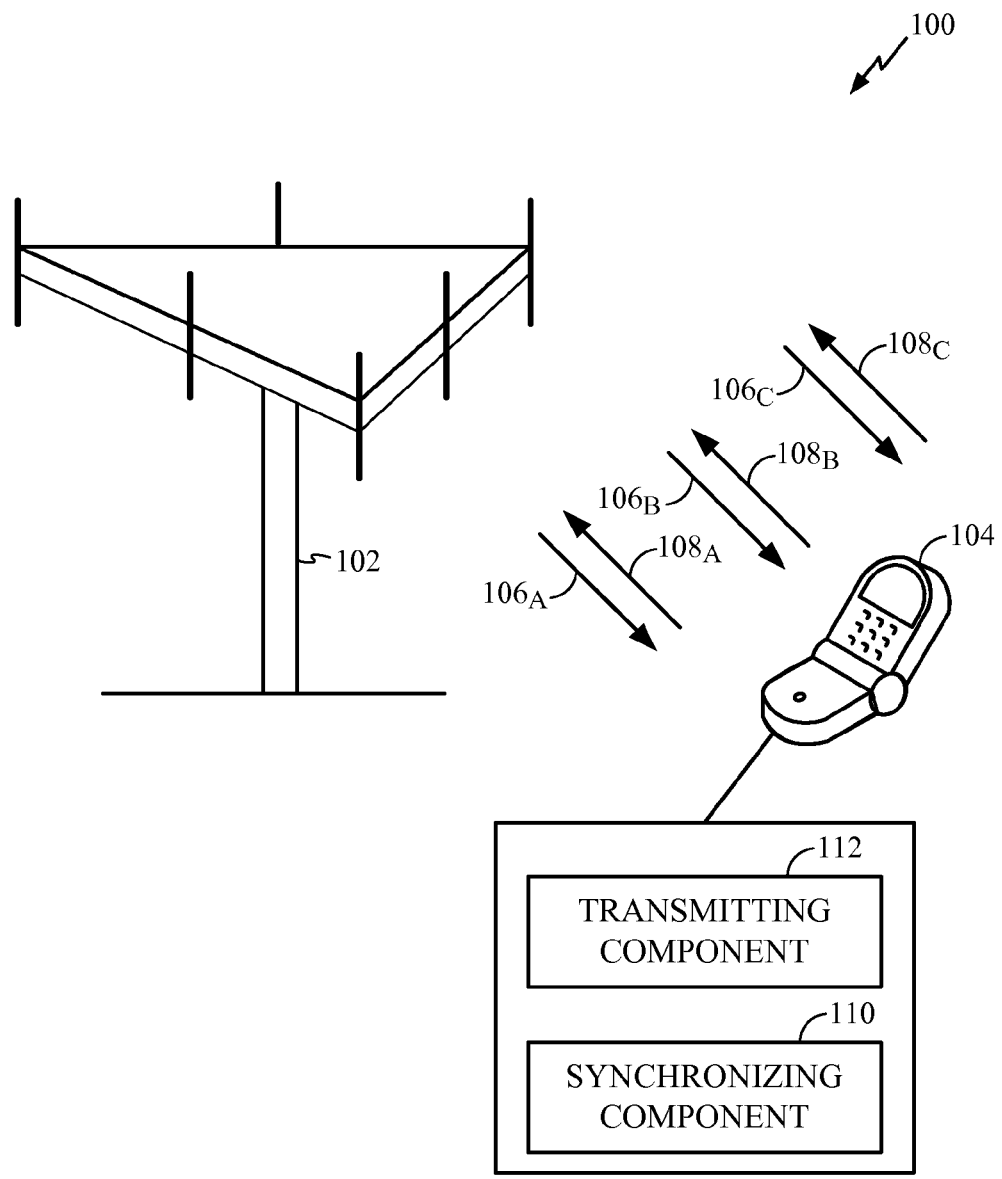
FIG. 1 is a schematic diagram of a multiple access wireless communication system according to one or more aspects.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), any handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, a multiple access wireless communication system 100 according to one or more aspects is illustrated. A wireless communication system 100 can include one or more base stations in contact with one or more UEs. Although a single UE is shown, each base station/Node B 102 provides coverage for a plurality of UEs. UE 104 is in communication with the Node B 102 that transmits information to UE 104 over forward link/downlink 106 and receives information from UE 104 over uplink/reverse link 108. Forward link (or downlink) refers to the communication link from the base stations to mobile devices, and the reverse link (or uplink) refers to the communication link from mobile devices to the base stations. System 100 is a multi-carrier communication system wherein more than one carrier is utilized by the Node B 102 to communicate with the UE 104. Each of the downlink carriers $106_{A-C}$ is paired with a corresponding uplink carrier $108_{A-C}$. Although a one-to-one correspondence between the downlink and uplink carriers is illustrated, it can be appreciated that this is not necessary. For example, while the Node B 102 transmits on a plurality of carriers, the UE 104 can use only a subset of the carriers to communicate with the Node B 102. In addition, various kinds of carriers are differentiated within the communication system 100 based on the type of services they provide. These carriers can comprise, anchor carriers, non-anchor carriers etc. Anchor carriers facilitate communication of SI (system information) for UEs in both connected mode and idle mode. Non-anchor carriers support only UEs in connected mode and hence do not transmit System Information (SI) etc.

In WCDMA, uplink transmit timing is derived from downlink timing. This is clearly defined for a single-carrier system. With more than one carrier on the downlink, such as is disclosed in HSUPA as defined in 3GPP release 8, transmit timing synchronization across carriers at each Node B may be used. In one example of the present patent application, the uplink transmit timing may be synchronized at each UE across multiple carriers in Multi-Carrier HSUPA.

Within a single carrier communication system 100, the Node B 102 determines channel timing and transmits it to the UE 104 via downlink transmissions 106. The UE 104 decodes pilot channel transmissions from the Node B 102 to determine timing for uplink transmissions. Thus, the UE 104 has the capability to follow the frame timing change of the Node B 102.

As the communication system 100 is a multicarrier system, the UE 104 decodes multiple pilot transmissions in order to determine timing for the corresponding uplink carriers. Thus, each of the uplink transmission times is based on the corresponding pilot channels received on the downlink and is determined independently of other uplink transmission timings. The uplink DPCCH (Dedicated Physical Control Channel)/DPDCH (Dedicated Physical Data Channel) transmission takes place approximately TO chips after the reception of the first detected path (in time) of the corresponding downlink DPCCH/DPDCH or F-DPCH frame from the reference cell. Apart from the transmit timing in the downlink DPCCH/DPDCH/F-DPCH (Fractional Dedicated Physical Channel), the uplink transmit timing is also dependent on the UE time tracking of the first arrival path. The accuracy of decoding the transmit timing is dependent on the UE time track loop (TTL) performance.

In Dual-carrier HSDPA (High Speed Downlink Packet Access), the transmit timing of the two carriers are synchronized at each Node B for both CPICH (Common Pilot Channel) and per-user PDCCH/DPDCH/F-DPCH frame. This simplifies acquisition of the carriers by the UE. As discussed supra, uplink carrier timings are determined by their respective pilot channels and are not automatically synchronized. This leads to greater errors/complications in acquiring uplink transmissions by the Node B 102. In a multicarrier system 100, when there are multiple uplink carriers to be paired with all or a subset of the multiple downlink carriers, such errors can be mitigated by synchronizing transmit timing on all uplink carriers. The synchronization feature may be extended to all the carriers when more than two downlink carriers are allowed in 3GPP Rel.9. When there are multiple uplink carriers paired with all or a subset of the multiple downlink carriers, it may be desirable to synchronize the transmit timing on all the uplink carriers.

The common uplink transmit timing may determined by an anchor uplink transmit timing or a combination of transmit timings of the anchor carrier and one or more non-anchor carriers. Hence, a synchronizing component 110 receives data generated by a processor associated with the UE 104 and upon suitable processing (channel coding/multiplexing, spreading etc.) multiple digital streams are combined after modification through successive phase shifts to form a single stream for digital-analogue conversion whereupon the analogue signal is subsequently transmitted by the transmitting component 112.

Figure 2:
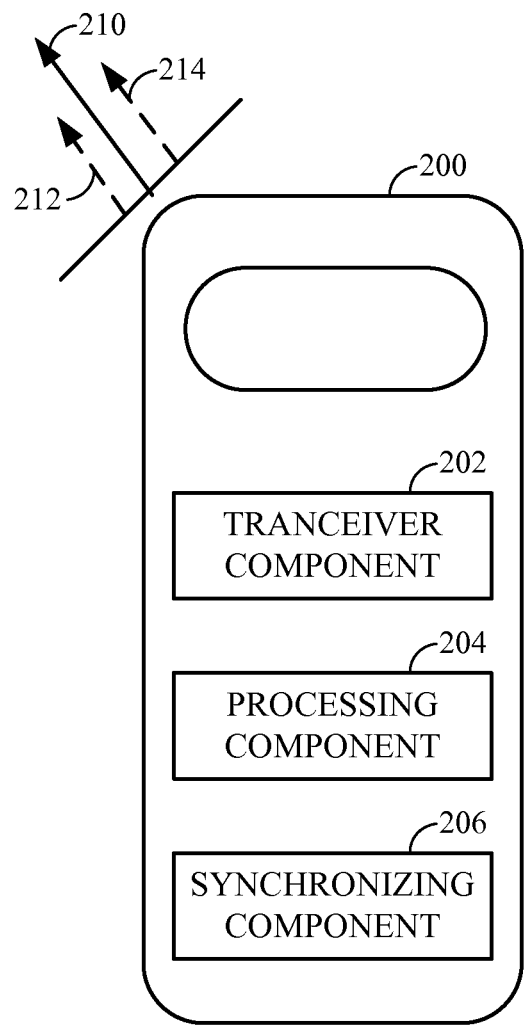
FIG. 2 illustrates a schematic diagram of a UE that transmits uplink carriers in accordance with an aspect.

FIG. 2 illustrates a schematic diagram of a UE that transmits uplink carriers in accordance with an aspect. As discussed supra, the UE 200 comprises of a transceiver component 202 to send/receive various transmissions. It also comprises of a processing component 204 and a synchronization component 206. It can be appreciated that although the processing component 204 and synchronization component 206 are shown as being disparate, this is not necessary. The functions executed by these components can be executed by a greater or lesser number of components. The transceiver component 202 receives the downlink transmissions from a Node B (not shown). In accordance with an aspect, the downlink transmissions can comprise control data that determines transmit timings for uplink carriers. In particular, the downlink control data can determine transmit timing of uplink anchor carriers. A UE is generally serviced by an anchor carrier as assigned by a Node B. However, in addition to an anchor carrier that transmits SI, uplink transmissions from a UE to a Node B can also comprise of one or more non-anchor carriers. Accordingly, UE 200 transmits information to the Node B via an anchor carrier 210 and two non-anchor carriers 212 and 214. Although two non-anchor carriers are illustrated, it can be appreciated that the number of non-anchor carriers can be more or less than two. The downlink transmissions received by the UE 200 are analyzed by the processing component 204 in order to determine uplink anchor carrier transmit timings. Additionally, the synchronization component 206 can also synchronize all the uplink carriers, including anchor carrier 210 and non-anchor carriers 212 and 214 such that they bear a particular phase relationship with each other. In a more detailed aspect, the phase relationship can be based on the anchor carrier transmit timing or a combination of anchor/non-anchor carrier transmit timings as determined by the processing component 204. However, it can be appreciated that the specific relationship between the anchor and the non-anchor carriers will depend on the transmit timing of the anchor carrier 210 as specified by the Node B or a combination of the transmit timings of the anchor carrier 210 and at least one non-anchor carrier. In a further aspect, the uplink timing, which is common to all the uplink carriers, is derived based on the measured downlink timing on the anchor carrier, or both the anchor and the secondary carrier. In this aspect, the transmit timing of the uplink anchor carrier 210 and the transmit timing of one of the uplink non-anchor carrier 212 can be determined by the Node B. The transmit timing of the uplink non-anchor carrier 214 can be determined by a combination of transmit timings of the uplink anchor carrier 210 and the uplink non-anchor carrier 212. It can be appreciated that this procedure is described only as a means of illustration but not limitation. For example, another methodology of determining transmit timing of uplink non-anchor carriers can be contemplated in this aspect. In accordance with the later methodology, the transmit timing of the non-anchor carrier 212 is initially derived from the transmit timing of the anchor carrier 210 and the transmit timing of the non-anchor carrier 214 can be further derived based on a combination of the transmit timings of the anchor carrier 210 and the non-anchor carrier 212. It can be further appreciated that although the procedures are described with respect to only two non-anchor carriers, they are not limited by the number of non-anchor carriers and therefore can be implemented regardless of the number of anchor/non-anchor carriers. As the Node B transmitting on the downlink has prior knowledge of the uplink anchor carrier transmit timing, it can conveniently decode the uplink non-anchor carrier transmit timings as they all bear a definite relationship with each other based on the anchor carrier transmit timing. Thus, transmission of such synchronized uplink carriers that bear a predetermined phase relationship with each other improves accuracy of decoding these carriers by the Node B.

Figure 3:
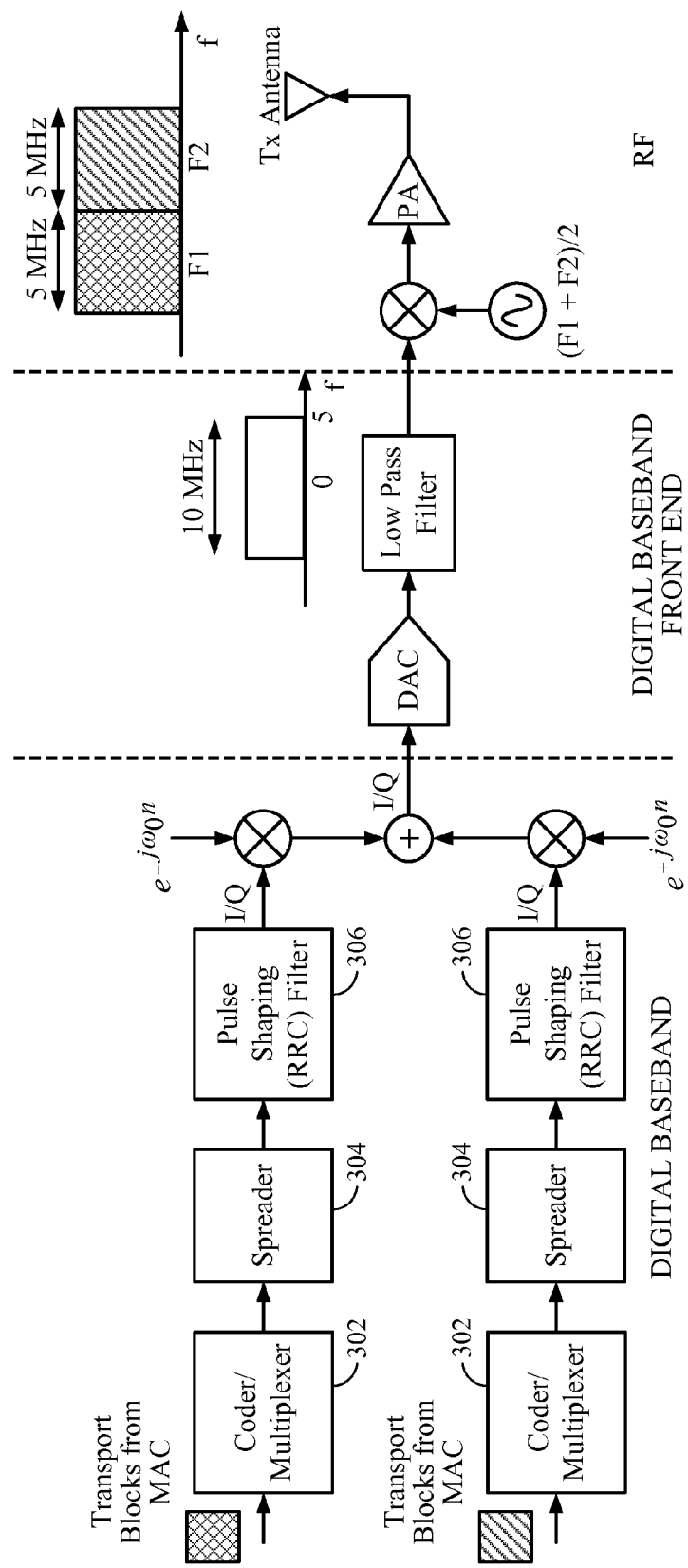
FIG. 3 is a schematic diagram of a UE implementing synchronization of uplink channels in accordance with the various aspects disclosed herein.

FIG. 3 is a schematic diagram of a UE implementing synchronization of uplink channels as discussed supra. Although this diagram shows synchronizing two data streams, it can be appreciated that this is only by the way of illustration and not limitation. The system 300 described herein can facilitate synchronizing a greater number of channels. In accordance with this aspect, two transport blocks from MAC (Media Access Control) layer are initially processed for channel coding and multiplexing as shown by a coder/multiplexer 302. Coded data to be transmitted is then spread with a channelization code by a channelizer/spreader 304. The data thus spread with the channelizing code is passed through a filter 306. The two digital steams are combined after a phase shift to form a single data stream for conversion into analogue format. The analogue signal is modulated by a signal RF source as shown at (F1+F2)/2. Thus, synchronization is maintained across the two carriers. This facilitates position location based on uplink measurements. Utilizing multiple uplink carriers can substantially improve accuracy in position location especially in multi-path rich environment as wider frequency leads to better time resolution. This architecture also simplifies encoding transmission data at the UE as it is easier to synchronize two carriers rather than time them separately based on respective pilot transmissions.

Figure 4:
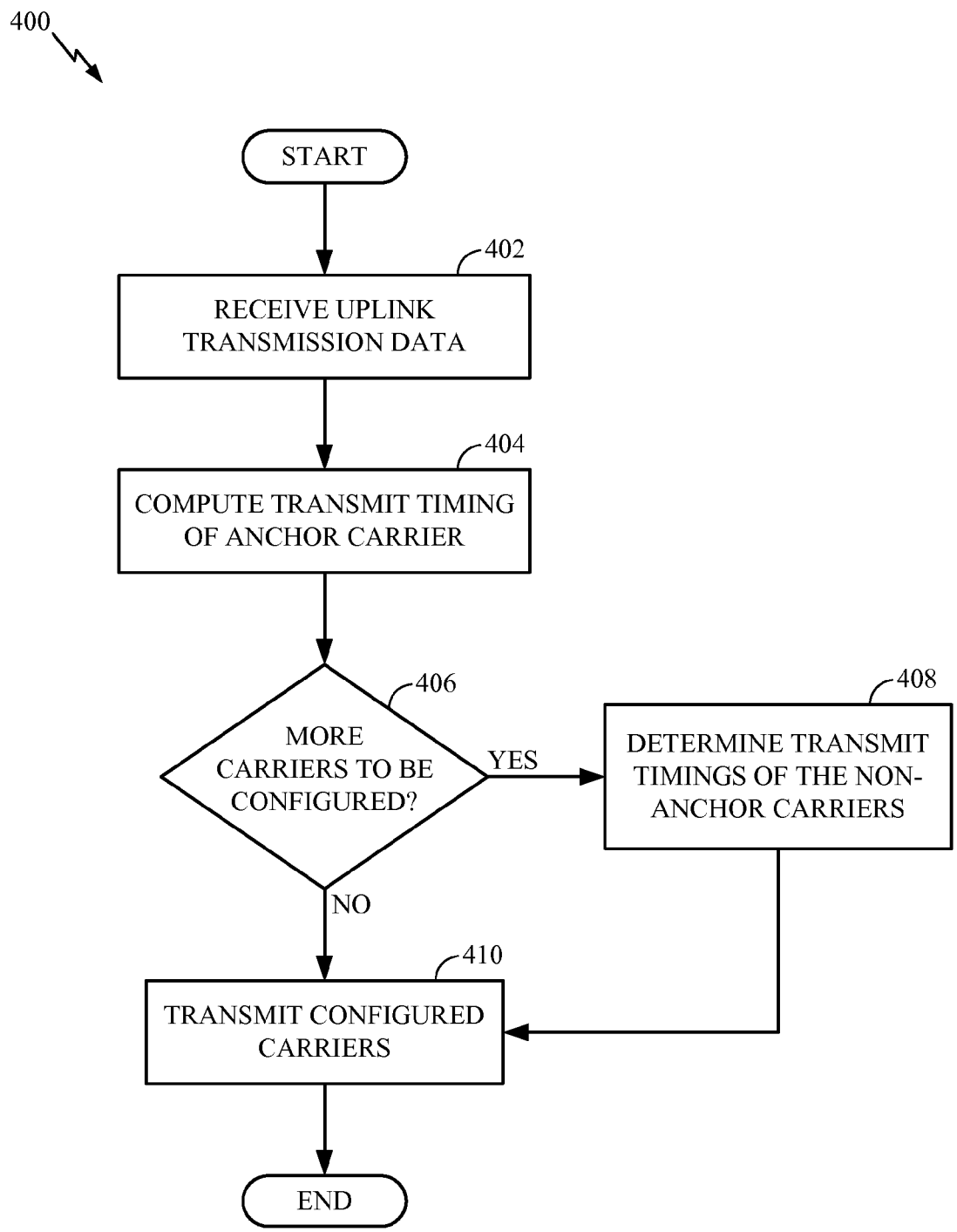
FIG. 4 shows a methodology of decoding uplink transmissions in accordance with an aspect.

FIG. 4 shows a methodology 400 of configuring uplink transmissions with better accuracy in accordance with an aspect. The method begins at 402 wherein transmission data associated with various uplink carriers is received. In accordance with different aspects, the uplink carriers can be one or more of non-anchor/secondary carriers and corresponding anchor carriers transmitting SI. Thus, the uplink transmissions can comprise both control data and user data in accordance with various aspects. At 404, the transmit timing of uplink anchor carrier is initially computed. At 406, it is determined if there are other carriers being utilized on the uplink. If there are no other carriers being utilized on the uplink, the method proceeds to 410. If at 406, it is determined that there are other non-anchor/secondary carriers that need to be configured, the method proceeds to 408 wherein the transmit timing of the other uplink carriers is determined. As described supra, the uplink transmit timing of an uplink non-anchor carrier can be based on the transmit timing of the uplink anchor carrier or a combination of transmit timings of the uplink anchor carrier and one or more other non-anchor carriers. The uplink data streams are configured according to the various computed transmit timings as shown at 408. The data streams thus configured are transmitted as shown at 410. It can also be noted that within the same cell, a UE can start operating on a different anchor carrier with a different transmit timing. This can occur due to various reasons, for example, load balancing. Such a change of anchor carrier can cause a corresponding change in the transmit timing of the non-anchor/secondary carriers. However, no change may occur if both the anchor carriers have similar transmit timings.

Figure 5:
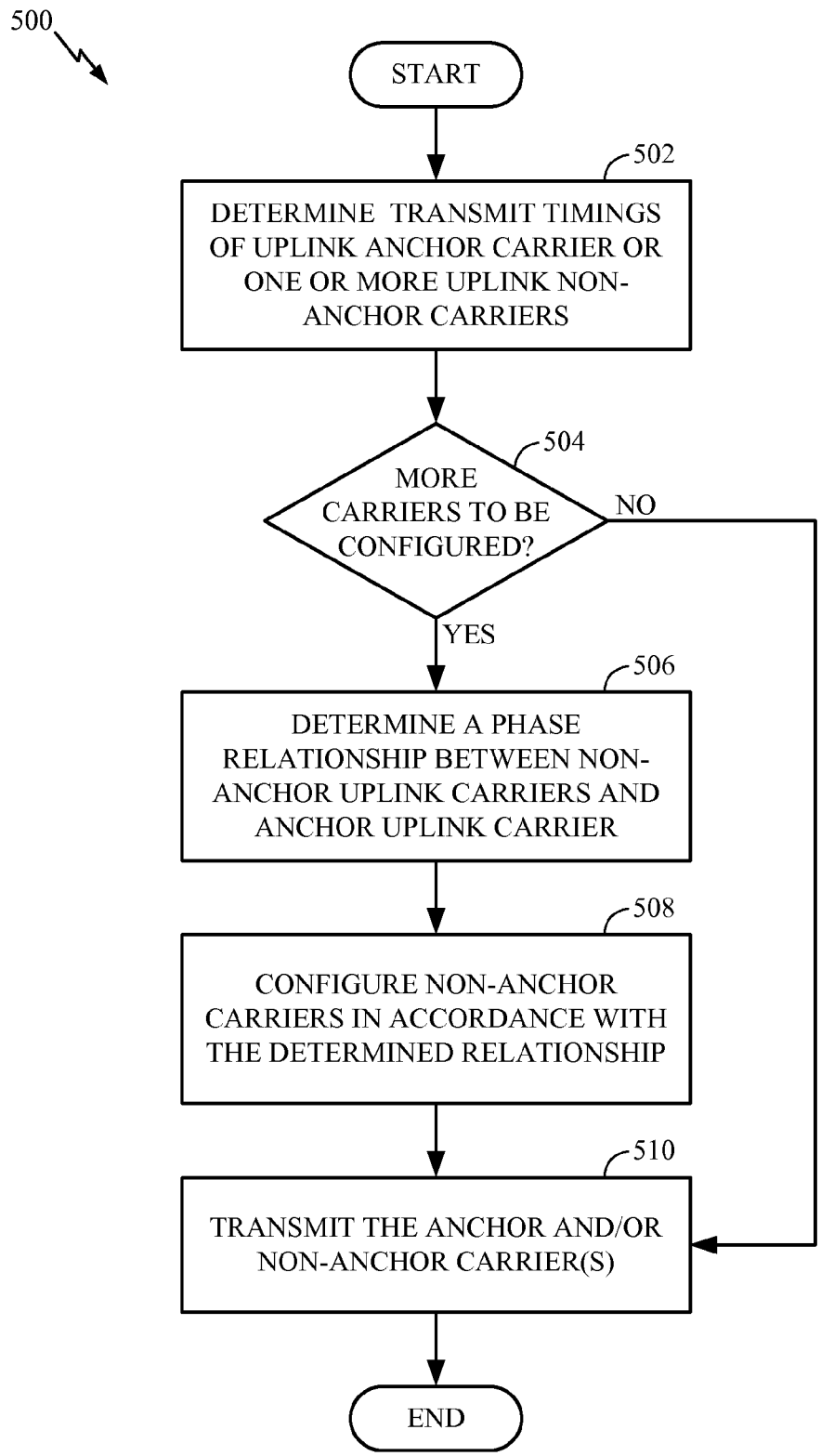
FIG. 5 is a flow chart illustrating a methodology of configuring uplink transmissions in accordance with a more detailed aspect.

FIG. 5 is a flow chart 500 illustrating a methodology of configuring uplink transmissions in accordance with a more detailed aspect. The methodology begins at step 502 wherein transmit timing for an uplink anchor carrier is determined. In accordance with an aspect, the uplink anchor carrier transmit timing can be determined by the control transmissions from the Node B servicing the UE. In a further aspect, the uplink transmit timings of one or more non-anchor carriers can also be determined based on the transmissions received from the Node B. At 504, it is determined if there are other carriers to be configured. For example, if a UE is transmitting both user data and control data, the uplink transmissions can be configured as anchor carriers transmitting control data and/or SI and as non-anchor carriers for transmission of user data. If at 504 it is determined that there are no more carriers to be configured, the anchor carriers are transmitted as show at 510 and the method terminates on the end block. If at 504, it is determined that one or more non-anchor carriers need to be configured, the methodology moves to 506. As mentioned supra, the transmit timing of the non-anchor carriers is computed based on transmissions from the Node B or the transmit timing of the uplink anchor carrier. In particular, a phase relationship can be determined between the various carriers based on the anchor carrier transmit timing. For example, the anchor and non-anchor carriers can be configured such that they maintain a particular phase relationship with each other based on the transmit timing of the anchor carrier or a combination of transmit timings of the uplink anchor carrier and one or more non-anchor carriers. Therefore, at 506 the phase relationship to be maintained between the various carriers is determined. More particularly, the phase relationship is developed such that the transmit waveforms of the anchor and the corresponding non-anchor carriers are completely aligned in time. At 508, the non-anchor carriers are configured in accordance with the determined phase relationship and all the configured carriers are transmitted as shown at 510.

Figure 6:
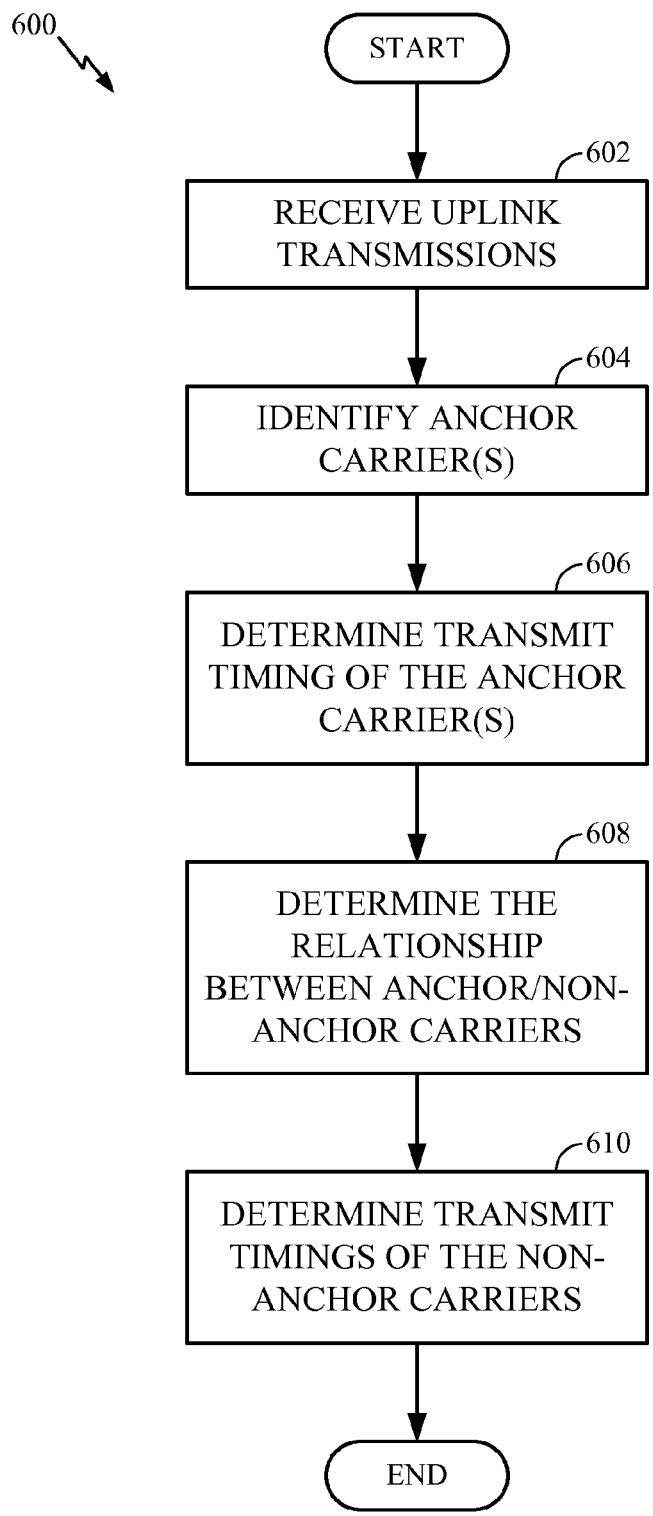
FIG. 6 is a flow chart detailing a method of receiving uplink transmissions in accordance with an aspect.

FIG. 6 is a flow chart 600 detailing a method of receiving uplink transmissions and in accordance with an aspect. The method begins at 602 wherein one or more uplink transmissions from the UE are received. In a further aspect, at least one of the uplink transmissions is an anchor carrier that carries control data associated with the UE. At 604, the anchor carrier is identified among the received uplink transmissions and the transmission timing of the anchor carrier is determined at 606. The uplink transmissions can additionally comprise one or more non-anchor carriers. Therefore, the method involves utilizing the transmit timings of the anchor carrier(s) to determine transmission timings of the non-anchor carriers associated with the corresponding anchor carrier. In particular, the anchor carrier from the UE bears a particular phase relationship with the corresponding non-anchor carriers wherein the relationship will depend on the anchor carrier transmit timing or a combination of transmit timings of the anchor and one or more non-anchor carriers such that the transmit waveforms of the anchor and the corresponding non-anchor carriers are completely aligned in time. Thus, the relationship between the anchor carrier and its corresponding non-anchor carriers from the UE is determined as shown at 608. At 610, the non-anchor carrier transmit timings are derived utilizing the relationship.

Figure 7:
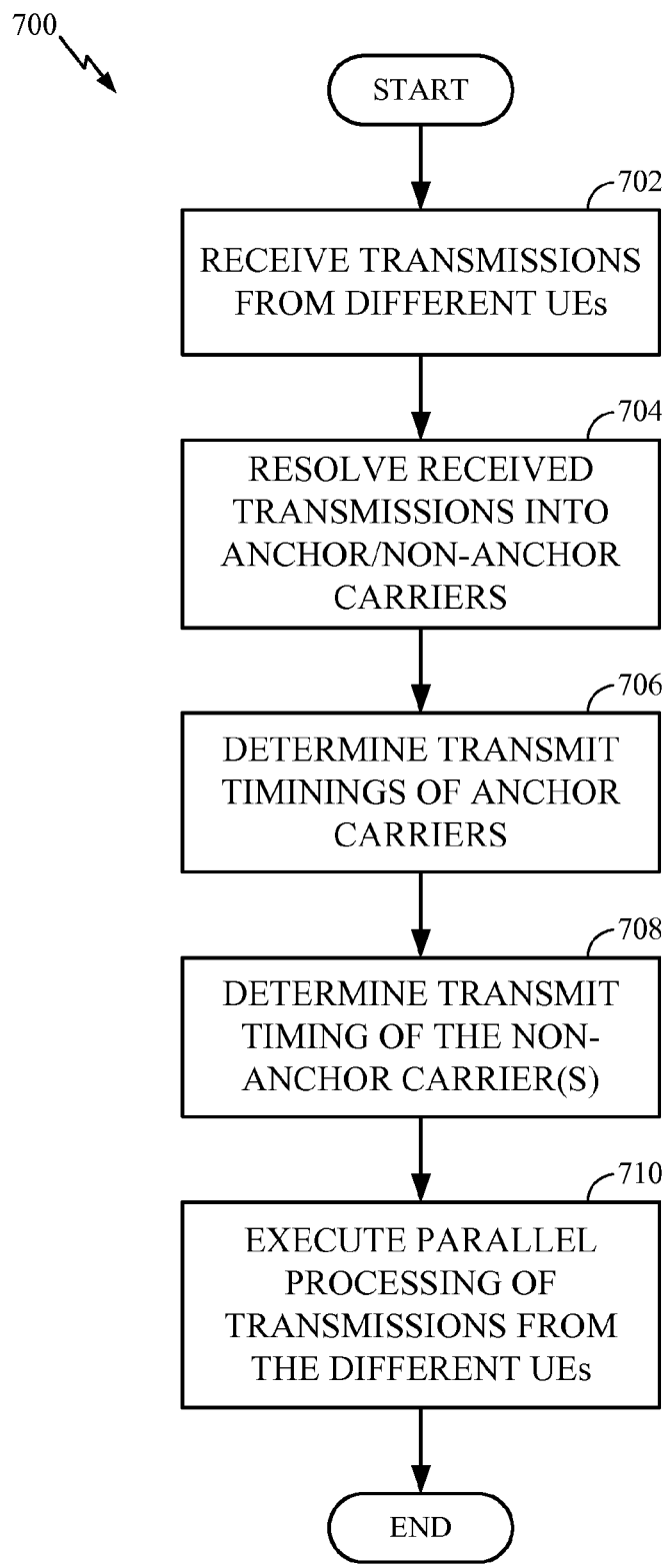
FIG. 7 is a flow chart detailing parallel processing that occurs at a Node B due the synchronization of non-anchor uplink carriers with the corresponding anchor carriers.

FIG. 7 is a flow chart 700 detailing parallel processing that occurs at a Node B due to the synchronization of non-anchor uplink carriers with the corresponding anchor carriers. A Node B can propagate a plurality of anchor carriers in order to service a plurality of UEs within its cell. While one anchor carrier can be used to service a plurality of UEs, each UE utilizes only a single anchor carrier for receiving SI. Therefore, other non-anchor uplink transmissions from a UE are synchronized with the anchor carrier as detailed supra. This aspect also facilitates parallel processing of carriers from various UEs within a cell as the transmissions from the UEs are synchronized with the corresponding anchor carriers. The flow chart 700 begins at 702 wherein various transmissions are received from different UEs. These transmissions can comprise both anchor and non-anchor carriers in accordance with an aspect. Therefore, the transmissions received from various UEs are resolved to identify anchor carriers and their corresponding non-anchor carriers as shown at 704. The timing of the non-anchor carriers can be estimated/determined based on the timing of the corresponding anchor carriers. Therefore, at 706 the Node B initially determines the timing of the anchor carrier. In accordance with this aspect, the step of determining anchor carrier transmit timing can involve a simple retrieval of information from associated memory modules as the transmit timings of the anchor carriers for UEs within a cell is initially set by the serving Node B. As the corresponding non-anchor carriers maintain a phase relationship with their respective anchor carriers, the transmit timings of the non-anchor carriers can also be determined/estimated based on this relationship as shown at 708. This ability to estimate timings of non-anchor carriers facilitates execution of parallel processing of the transmissions from the different UEs as the arrival of various carriers at the Node B can be predicted based on their estimated transmit timings as shown at 710. This would not be possible if the non-anchor uplink carriers were synchronized with their respective pilot transmissions.

Figure 8:
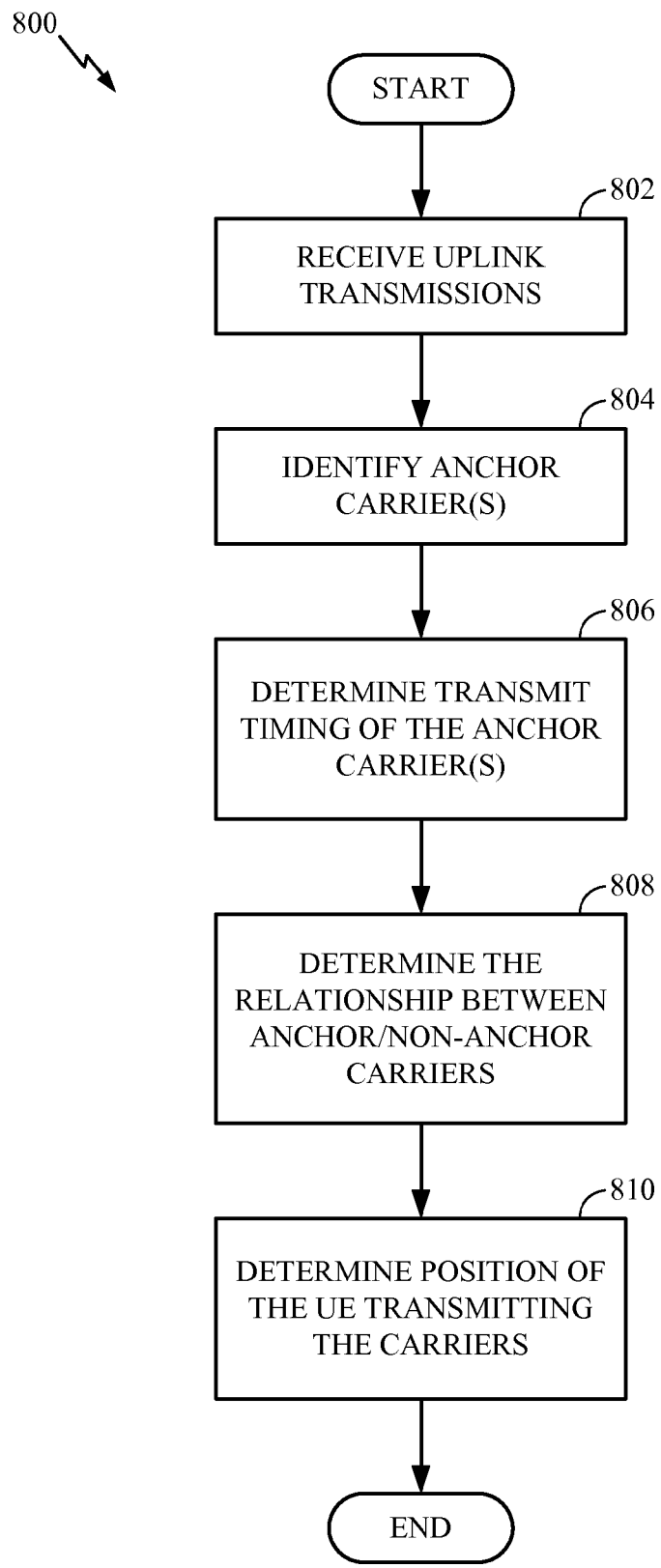
FIG. 8 is a flow chart detailing a method of receiving uplink transmissions and determining position of a transmitting UE in accordance with an aspect.

FIG. 8 is a flow chart 800 detailing a method of receiving uplink transmissions and determining position of a transmitting UE in accordance with an aspect. The method begins at 802 wherein one or more uplink transmissions from the UE are received. In a further aspect, at least one of the uplink transmissions is an anchor carrier that carries control data associated with the UE. At 804, the anchor carrier is identified among the received uplink transmissions and the transmission timing of the anchor carrier is determined at 808. The uplink transmissions can additionally comprise one or more non-anchor carriers. In particular, the anchor carrier from the UE bears a particular phase relationship with the corresponding non-anchor carriers wherein the relationship will depend on the anchor carrier transmit timing or a combination of transmit timings of the anchor and one or more corresponding non-anchor carriers. Thus, the relationship between the anchor carrier and its corresponding non-anchor carriers from the UE is determined as shown at 808. In a more detailed aspect, the relationship can be based on the phase of the transmissions, for example, by maintaining all the uplink carriers aligned in time. This procedure not only simplifies the process of decoding uplink transmissions at the Node B thereby mitigating decoding errors, it also substantially enhances locating position of the UE as shown at the step 810. Thus, accuracy in locating the UE can be improved by utilizing multiple uplink carriers as employing wider frequency from synchronized multiple carriers leads to better time resolution.

The present method and apparatus simplifies the Node B acquisition of the non-anchor carriers. Furthermore, it may benefit the position-location based on uplink measurements. Utilizing multiple uplink carriers may improve the accuracy in position location especially in multi-path rich environment. This is a manifestation of the uncertainty law (wider frequency leads to better time resolution).

Figure 9:
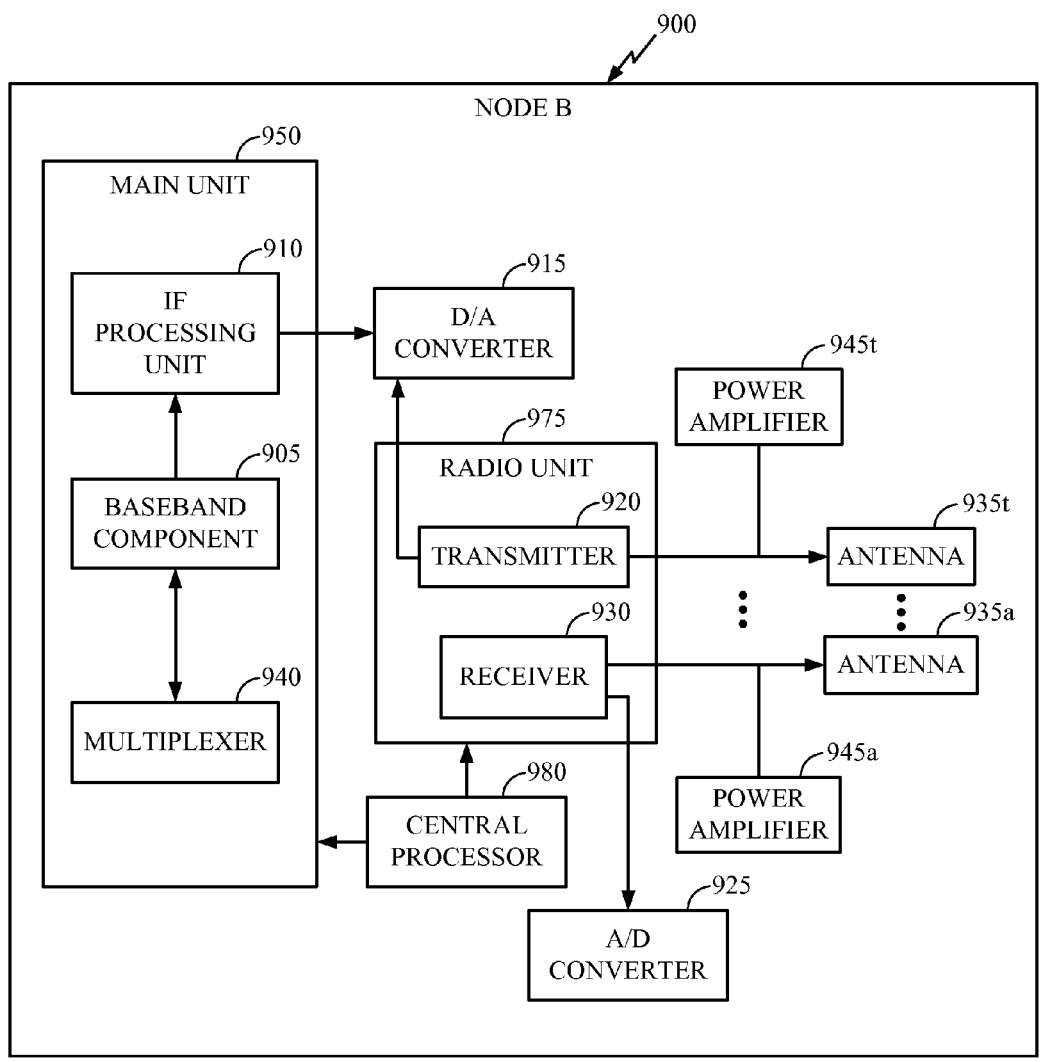
FIG. 9 illustrates a schematic diagram of a Node B for receiving and processing uplink transmissions in accordance with different aspects described herein.

FIG. 9 illustrates a schematic diagram of a Node B for receiving and processing uplink transmissions in accordance with different aspects described herein. A Node B 900 can comprise a main unit (MU) 950 and a radio unit (RU) 975. MU 950 includes the digital baseband components of the Node B comprising for example, a baseband component 905, a digital intermediate frequency (IF) processing unit 910 and a multiplexer 940. Digital IF processing unit 910 digitally processes radio channel data at an intermediate frequency by performing such functions as filtering, channelizing, modulation, and so forth. RU 975 includes one or more means for receiving, for example, receivers 930 connected to one more antennas 935a-t for receiving radio communications from the UEs. In an aspect, one or more power amplifiers 945 a-t are coupled to one or more antennas 935 a-t. Connected to the receiver 930 is an analog-to-digital (A/D) converter 925 that converts the analog radio communications received by receiver 930 into digital input for transmission to baseband component 905 via digital IF processing unit 910. Thus, transmissions from different UEs comprising a plurality of carriers including at least one anchor carrier are received by the receiver 930. RU 975 can also include one or more transmitters 920 connected to either the same or different antenna 935 for transmitting radio communications, including for example, transmit timings of the anchor carriers to UEs. Connected to transmitter 920 is a digital-to-analog (D/A) converter 915 that converts the digital communications received from baseband component 905 via digital IF processing unit 910 into analog output for transmission to the UEs. In some embodiments, a multiplexer 940 is used for multiplexing of multiple-channel signals and multiplexing of a variety of signals including a voice signal and a data signal. A means for processing, such as, a central processor 980 is coupled to main unit 950 and Radio Unit 975 for controlling various processes which include processing user or control data such as the transmit timings for carriers or other processing tasks. For example, the processor 980 can derive the transmit timings of uplink non-anchor carriers received at the Node B 900 based on the transmit timings of the anchor carriers provided the transmitting UE synchronizes all the uplink carriers based on the uplink anchor carrier transmit timings.

Figure 10:
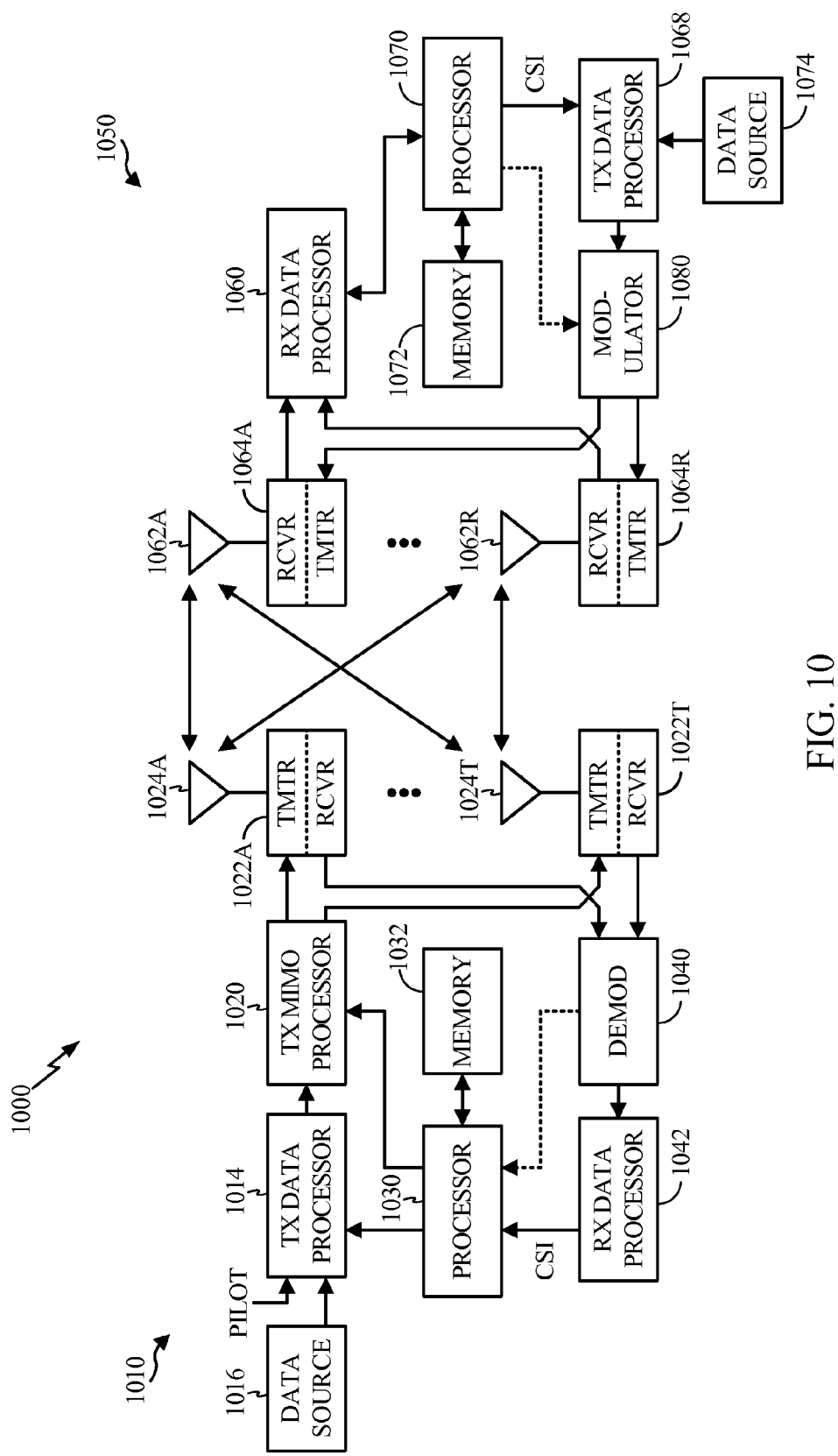
FIG. 10 is a block diagram of an embodiment of a transmitter system (also known as the access point or base station or Node B) and a receiver system (also known as access terminal or user equipment) in a MIMO system.

FIG. 10 is a block diagram of an embodiment of a transmitter system 1010 (also known as the access point or base station or Node B) and a receiver system 1050 (also known as access terminal or user equipment) in a MIMO system 1000. At the transmitter system 1010, traffic data for a number of data streams is provided from a data source 1016 to a transmit (TX) data processor 1014.

In an embodiment, each data stream is transmitted over a respective transmit antenna. TX data processor 1014 formats, codes, and interleaves the traffic data for each data stream based on a particular coding scheme selected for that data stream to provide coded data.

The coded data for each data stream may be multiplexed with pilot data retrieved from memory 1032 using OFDM techniques. The pilot data is typically a known data pattern that is processed in a known manner and can be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 1030.

The modulation symbols for all data streams are then provided to a TX MIMO processor 1020, which may further process the modulation symbols (e.g., for OFDM). TX MIMO processor 1020 then provides $N_T$ modulation symbol streams to $N_T$ transmitters (TMTR) 1022a through 1022t. In certain embodiments, TX MIMO processor 1020 applies beamforming weights to the symbols of the data streams and to the antenna from which the symbol is being transmitted.

Each transmitter 1022 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 1022a through 1022t are then transmitted from $N_T$ antennas 1024a through 1024t, respectively.

At receiver system 1050, the transmitted modulated signals are received by $N_R$ antennas 1062a through 1062r and the received signal from each antenna 1062 is provided to a respective receiver (RCVR) 1064a through 1064r. Each receiver 1064 conditions (e.g., filters, amplifies, and downconverts) a respective received signal, digitizes the conditioned signal to provide samples, and further processes the samples to provide a corresponding "received" symbol stream which can be stored in memory 1072.

An RX data processor 1060 then receives and processes the $N_R$ received symbol streams from $N_R$ receivers 1064 based on a particular receiver processing technique to provide $N_T$ "detected" symbol streams. The RX data processor 1060 then demodulates, deinterleaves, and decodes each detected symbol stream to recover the traffic data for the data stream. The processing by RX data processor 1060 is complementary to that performed by TX MIMO processor 1020 and TX data processor 1014 at transmitter system 1010.

A processor 1070 periodically determines which pre-coding matrix to use (discussed below). Processor 1070 formulates a reverse link message comprising a matrix index portion and a rank value portion.

The reverse link message may comprise various types of information regarding the communication link and/or the received data stream which can be retrieved from memory 1072. The reverse link message is then processed by a TX data processor 1068, which also receives traffic data for a number of data streams from a data source 1074, modulated by a modulator 1080, conditioned by transmitters 1064a through 1064r, and transmitted back to transmitter system 1010.

At transmitter system 1010, the modulated signals from receiver system 1050 are received by antennas 1024, conditioned by receivers 1022, demodulated by a demodulator 1040, and processed by a RX data processor 1042 to extract the reserve link message transmitted by the receiver system 1050. Processor 1030 then determines which pre-coding matrix to use for determining the beamforming weights and then processes the extracted message.

Figure 11:
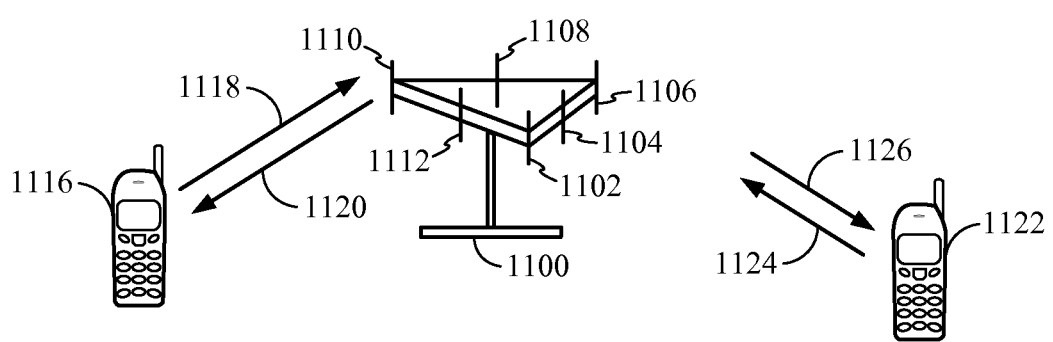
FIG. 11 is a multiple access wireless communication system according to one embodiment illustrated.

Referring to FIG. 11, a multiple access wireless communication system according to one embodiment is illustrated. A Node B 1100 includes multiple antenna groups, one including 1102 and 1104, another including 1106 and 1108, and an additional group including 1110 and 1112. In FIG. 11, only two antennas are shown for each antenna group, however, more or fewer antennas may be utilized for each antenna group. User Equipment 1116 (UE) is in communication with antennas 1110 and 1112, where antennas 1110 and 1112 transmit information to access terminal 1116 over forward link 1120 and receive information from the UE 1116 over reverse link 1118. User Equipment 1122 is in communication with antennas 1106 and 1108, where antennas 1106 and 1108 transmit information to UE 1122 over forward link 1126 and receive information from UE 1122 over reverse link 1124. In a FDD system, communication links 1118, 1120, 1124 and 1126 may use different frequency for communication. For example, forward link 1120 may use a different frequency than that used by reverse link 1118.

Each group of antennas and/or the area in which they are designed to communicate is often referred to as a sector of the access point/base station. In the embodiment, the antenna groups are designed to communicate to access terminals in a sector, or the areas covered by Node B/access point/base station 1100 (AP/BS).

In communication over forward links 1120 and 1126, the transmitting antennas of the Node B 1100 utilize beamforming in order to improve the signal-to-noise ratio of forward links for the different User Equipment 1116 and 1122. Also, a Node B using beamforming to transmit to UEs scattered randomly through its coverage causes less interference to UEs in neighboring cells than a Node B transmitting through a single antenna to all its UEs.

A Node B may be a fixed station used for communicating with the terminals and may also be referred to as an access point, a base station, or some other terminology. An access terminal may also be called user equipment (UE), a wireless communication device, terminal, or some other terminology.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In aspect, Logical Traffic Channels comprises a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. An apparatus operable in a wireless communication system, the apparatus comprising:
   a processor that generates transmission data for a plurality of uplink carriers;

a synchronizing component for synchronizing transmit timings between the plurality of uplink carriers, wherein synchronizing transmit timings of the plurality of uplink carriers is based on a phase relationship indicated by a transmit timing of an anchor carrier of the plurality of uplink carriers and at least one transmit timing of at least one non-anchor carrier of the plurality of uplink carriers, and wherein the anchor carrier facilitates communication of system information (SI) for the apparatus and the at least one non-anchor carrier does not support communication of the SI for the apparatus;
a transmission component that transmits the plurality of uplink carriers after synchronization by the synchronizing component; and
a memory coupled to the processor for storing the transmission data.

2. The apparatus of claim 1, further comprising a multiplexer for multiplexing the transmission data.

3. The apparatus of claim 1, further comprising a digital-to-analogue converter that converts a single digital data stream, obtained by combining data streams of the plurality of uplink carriers after synchronization by the synchronizing component, into an analogue signal.

4. The apparatus of claim 1, wherein the anchor carrier facilitates communication of SI for the apparatus in both connected mode and idle mode.

5. The apparatus of claim 1, wherein the at least one non-anchor carrier only supports communication for the apparatus in connected mode.

6. A method used in wireless communication system, the method comprising:
configuring, at a user equipment, a plurality of uplink carriers to transmit information;
synchronizing the plurality of uplink carriers, at the user equipment, wherein synchronizing the plurality of uplink carriers is based on a phase relationship indicated by a transmit timing of an anchor carrier of the plurality of uplink carriers and at least one transmit timing of at least one non-anchor carrier of the plurality of uplink carriers, and wherein the anchor carrier facilitates communication of system information (SI) for the user equipment and the at least one non-anchor carrier does not support communication of the SI for the user equipment; and
transmitting the uplink carriers from the user equipment subsequent to the synchronization.

7. The method of claim 6, wherein the configuring includes configuring the anchor carrier.

8. The method of claim 7, further comprising pairing the uplink carriers with at least a subset of received downlink carriers upon synchronization.

9. A computer program product, comprising:
a non-transitory computer-readable medium comprising code for:
configuring plurality of uplink carriers, at a user equipment, to transmit information; and
synchronizing transmit timing among the plurality of uplink carriers such that the plurality of uplink carriers are aligned in time with each other,
wherein synchronizing transmit timing among the uplink carriers is based on a phase relationship indicated by a transmit timing of an anchor carrier of the plurality of uplink carriers and at least one transmit timing of at least one non-anchor carrier of the plurality of uplink carriers, and wherein the anchor carrier facilitates communication of system information (SI) for the user equipment and the at least one non-anchor carrier does not support communication of the SI for the user equipment.

10. The computer program product of claim 9, further comprising instructions to configure at least one of the uplink carriers as the anchor carrier.

11. The computer program product of claim 9, further comprising instructions for combining the uplink carriers into a single stream.

12. The computer program product of claim 11, further comprising instructions to convert the single stream into an analogue signal for transmission.

13. An apparatus operable in wireless communication system, the apparatus comprising:
means for configuring a plurality of carriers to transmit data; and
means for synchronizing transmit timing among the plurality of carriers such that the plurality of carriers maintain a predetermined time alignment with each other,
wherein the means for synchronizing transmit timing among the plurality of carriers is based on a phase relationship indicated by a transmit timing of an anchor carrier of the plurality of carriers and at least one transmit timing of at least one non-anchor carrier of the plurality of carriers, and wherein the anchor carrier facilitates communication of system information (SI) for the apparatus and the at least one non-anchor carrier does not support communication of the SI for the apparatus.

14. The apparatus of claim 13, wherein at least one of the plurality of carriers is an anchor carrier.

15. An apparatus operable in a wireless communication system, the apparatus comprising:
a receiver for receiving a plurality of uplink carriers from a transmitting UE; and
a processor that reads data received from the UE via the plurality of uplink carriers, wherein transmit timings of the plurality of uplink carriers are synchronized with each other,
wherein transmit timings of the plurality of uplink carriers are synchronized based on a phase relationship indicated by a transmit timing of an anchor carrier of the plurality of uplink carriers and at least one transmit timing of at least one non-anchor carrier of the plurality of uplink carriers, and wherein the anchor carrier facilitates communication of system information (SI) for the apparatus and the at least one non-anchor carrier does not support communication of the SI for the apparatus.

16. A method used in wireless communication system, the method comprising:
receiving, at a network entity from at least one user equipment, a plurality of carriers comprising at least one uplink anchor carrier; and
estimating, for each user equipment, transmit timings of a non-anchor carrier comprised within the plurality of carriers based on a phase relationship indicated by a transmit timing of a corresponding uplink anchor carrier and at least one transmit timing of at least one non-anchor carrier, and wherein the corresponding uplink anchor carrier facilitates communication of system information (SI) for the user equipment and the corresponding at least one non-anchor carrier does not support communication of the SI for the user equipment.

17. The method of claim 16, further comprising determining a position of a respective user equipment transmitting at least a subset of the plurality of carriers based at least on the transmit timings of the subset of the plurality of carriers.

18. The method of claim 16, further comprising receiving the plurality of carriers from a plurality of user equipments (UEs).

19. The method of claim 18, further comprising processing transmissions from the plurality of UEs simultaneously based at least on the estimated transmit timings of respective uplink carriers.

20. A computer program product, comprising:
a non-transitory computer-readable medium comprising code for:
receiving, at a network entity from at least one user equipment, a plurality of carriers comprising at least one uplink anchor carrier; and
determining, for each user equipment, transmit timing of at least one non-anchor carrier comprised within the plurality of carriers based on a phase relationship indicated by a transmit timing of a corresponding uplink anchor carrier and at least one transmit timing of at least one non-anchor carrier, and wherein the corresponding uplink anchor carrier facilitates communication of system information (SI) for the user equipment and the corresponding at least one non-anchor carrier does not support communication of the SI for the user equipment.

21. The computer program product of claim 20, further comprising code for determining a position of a respective user equipment transmitting at least a subset of the plurality of carriers based at least on transmit timings of the subset of the plurality of carriers.

22. The computer program product of claim 20, further comprising code for receiving the plurality of carriers from a plurality of user equipments (UEs).

23. The computer program product of claim 22, further comprising code for processing transmissions from the plurality of UEs simultaneously based at least on the transmit timings of respective non-anchor carriers.

24. An apparatus operable in a wireless communication system, the apparatus comprising:
means for receiving, from at least one user equipment, a plurality of carriers comprising at least one uplink anchor carrier; and
means for determining, for each user equipment, transmit timings of at least one non-anchor carrier comprised within the plurality of carriers based at least on a phase relationship indicated by a transmit timing of a corresponding uplink anchor carrier and at least one transmit timing of at least one non-anchor carrier, and wherein the corresponding uplink anchor carrier facilitates communication of system information (SI) for the user equipment and the corresponding at least one non-anchor carrier does not support communication of the SI for the user equipment.

* * * * *